United States Patent [19]

Babbitt et al.

[11] B 4,013,696

[45] Mar. 22, 1977

[54] ELEMENT COMPRISING A COATING LAYER CONTAINING A MIXTURE OF A CATIONIC PERFLUORINATED ALKYL AND AN ALKYLPHENOXY-POLY(PROPYLENE OXIDE)

[75] Inventors: John M. Babbitt, E. Rochester; James F. Houle, Rochester, both of N.Y.

[73] Assignee: Eastman Kodak Company, Rochester, N.Y.

[22] Filed: Aug. 28, 1974

[21] Appl. No.: 501,379

[44] Published under the second Trial Voluntary Protest Program on March 30, 1976 as document No. B 501,379.

Related U.S. Application Data

[60] Division of Ser. No. 382,618, July 25, 1973, Pat. No. 3,850,640, which is a continuation-in-part of Ser. No. 230,450, Feb. 29, 1972, Pat. No. 3,775,126.

[52] U.S. Cl. .................................. 428/412; 96/67; 96/83; 96/87 A; 96/114.2; 96/114.5; 106/125; 427/414; 428/474; 428/477; 428/480; 428/523; 428/532; 428/537

[51] Int. Cl.$^2$ ...................... G03C 1/76; C09D 3/04

[58] Field of Search .......... 117/83, 81, 69, 138.8 B; 106/125; 96/83, 67, 87 A, 114.2, 114.5, 114.7; 427/414, 402; 428/412, 474, 477, 480, 523, 532, 537

[56] References Cited

UNITED STATES PATENTS

| | | | |
|---|---|---|---|
| 3,775,126 | 11/1973 | Babbitt et al. | 96/114.2 X |
| 3,811,889 | 3/1974 | Endou et al. | 96/114.2 X |

FOREIGN PATENTS OR APPLICATIONS

| | | | |
|---|---|---|---|
| 424,295 | 6/1972 | Australia | 96/114.2 |

*Primary Examiner*—Ralph Husack
*Attorney, Agent, or Firm*—E. W. Milan

[57] ABSTRACT

A combination of improved coatability of a coating composition onto an anionic surfactant-containing contiguous layer of a radiation-sensitive or non-radiation sensitive film element, plus better control of static electricity on the resulting coated film element, especially on a radiation sensitive photographic element, results from using a coating composition containing a surfactant mixture of (a) a certain type of cationic perfluorinated alkyl surfactant, such as perfluorooctylsulfonamido-(N-propyl-3-N,N,N-trimethyl) ammonium iodide, with (b) a certain type of nonionic alkylphenoxypoly(propylene oxide) surfactant, such as para-isononylphenoxy decaglycidol, as a coating aid in the application of fluid coatings, preferably by simultaneous coating techniques, to form multiple layers in an element during the making of the element. The presence of a hydrophilic polymeric binder, such as gelatin, in the coating composition is desirable.

14 Claims, 6 Drawing Figures

ELEMENT COMPRISING A COATING LAYER CONTAINING A MIXTURE OF A CATIONIC PERFLUORINATED ALKYL AND AN ALKYLPHENOXY-POLY(PROPYLENE OXIDE)

This is a division, of application Ser. No. 382,618 filed July 25, 1973, now U.S. Pat. No. 3850640, which is a continuation-in-part of U.S. application Ser. No. 230,450, filed Feb. 29, 1972, now U.S. Pat. No. 3775,126.

BACKGROUND OF THE INVENTION

This invention relates to coated elements, to coating processes used in the manufacture of coated elements, and to surfactant coating compositions useful as coating aids in such processes. More particularly, the present invention relates to the use of a surfactant coating composition which can be uniformly applied as a coating aid layer upon a contiguous layer, such as a gelatin-containing coating layer also containing an anionic surfactant, for example a layer of a radiation sensitive film element to facilitate manufacture of the element, while also providing the resulting surfactant coated surface of the element with improved protection against development of electrical charge.

Many image-recording systems use image-forming materials comprising a support such as glass, metal, paper or plastic, overcoated with one or more layers comprising hydrophilic colloidal materials such as gelatin, at least some of which layers contain one or more materials that are sensitive to radiation. The best known of the image-recording systems utilizes silver salt(s) as the sensitive material. However, a wide variety of other materials are sensitive to radiation (reacting in a desired manner upon exposure to radiation) including certain unsaturated polymers and non-silver photographic systems. In image-recording systems, the layer containing the radiation sensitive material is frequently used in combination with several other layers of various coatings which are applied in a plurality of coatings on one surface or the other or both surfaces of a base or support, and which serve, for example, as carriers for reflective pigments, antihalation pigments or dyes, or filter dyes, or as undercoatings to improve adhesion and coatings to impart abrasion resistance, and the like. Other systems for other purposes using a plurality of layers similarly also are known.

In the deposition of coating compositions for the formation of contiguous coatings, or layers, particularly those containing gelatin, it has been customary to employ surface active agents as coating aids in the coating compositions to improve the quality and uniformity of the layers, and to improve the ease and reproductibility of their application. While the use of surfactants in this way can improve the properties of a particular deposited, or coated, layer, they can also adversely affect the characteristics of the element, for example, by causing surface variations, repellency between substrate layers, "pulling in" of coatings from the edges of the film, permeability to processing solutions, and the like. For example, the presence of certain surfactants in an earlier-applied layer of coating can deleteriously affect the surface characteristics of a later-applied layer of coating, when the layers are contiguous layers, as in a coated silver halide emulsion layer, thereby making it extremely difficult to apply the later-applied layer of coating without defects even if a surfactant coating aid is present in the later-applied layer.

An example of a particularly troublesome situation is that which results when one applies a conventional radiation sensitive coating composition comprising, for example, water, a photographic dye, silver halide, gelatin and an anionic surfactant such as a sodium alkylaryl sulfonate (in appropriate amounts) to a support material, such as a conventional gelatin-subbed cellulose acetate film, or a subbed polyester photographic film support, forming on the gelatin containing layer a layer of radiation sensitive coating having a highly surface active surface, and one then attempts substantially simultaneously to overcoat upon such surface of the coating, at high production machine rates of several hundred feet per minute, a protective layer of gelatin, for example, from an aqueous cationic or nonionic surfactant-containing overcoating composition. It is found that one obtains an overcoated radiation sensitive element having many surface defects, such as repellency, pulled in edges, crescents, and the like, even though one or more conventional surfactants are used in the aqueous overcoating composition in an attempt to solve such coating difficulties.

Another serious problem which arises in the manufacture and use of polymeric film products, and especially of radiation sensitized (radiographic or photographic) materials, is the generation of static electrical charge. In the case of such sensitized goods, serious deleterious effects are produced when accumulated electrical charges discharge, producing light and/or "noise," (which is recorded as an image on photosensitive materials and as static on other materials, such as magnetic tape, that are sensitized to other specific, non-visible electromagnetic irradiations). Such discharge may occur in the course of manufacturing processes, such as coating, finishing or packaging, or it may occur during use of the finished product in cameras, printers, tape players and other associated equipment. Another less obvious deleterious effect which results from accumulation of charge on polymeric supports, coated or uncoated, in the manufacturing operation, is the production of coating defects such as "core mottle" and "roll convolution repeat", both of which are well known to those involved in the manufacture of these types of materials. Both of these undesirable effects are due to the uncontrolled, undesirable build-up of localized electrically charged areas on, or in the various products, in the course of the film manufacturing operation. These areas of localized charge give rise to nonuniformity in the overlying sensitized coatings during their application and combine with the above-discussed problems arising from surfactant use to create additional problems.

The Prior Art

One conventional type of surfactant that is well known for its surprisingly good ability as a coating aid is the nonionic type termed "alkylphenoxy poly(propylene oxide)" materials having the formula:

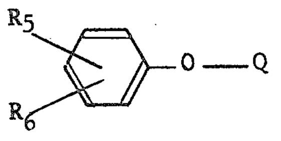

wherein $R_5$ is an alkyl group and contains from 6 to 18 carbon atoms, $R_6$ is hydrogen or an alkyl group of from 1 to 18 carbon atoms, and Q is a polyether group comprising an average of from about 3 to about 15 units derived from glycidol (hydroxypropylene oxide), and the polyether group comprises n-propylene and isopropylene moieties. (Such nonionic materials are described in detail in U.S. Pat. 3,514,293 issued to Knox. The disclosure of the Knox patent is hereby incorporated by reference into the present patent application). However, on certain highly surface active layers, such as that described above, even the use of the Knox invention has not proved to be entirely satisfactory. The same can be said, in terms of varying degrees of nonsuccess, for many other surfactants that are ordinarily utilized as coating aids in the manufacture of coated film elements, particularly radiation sensitive elements. Other prior art will be discussed herein where reference thereto is pertinent.

SUMMARY OF THE PRESENT INVENTION

A solution to the foregoing combination of problems has been found to reside in the discovery of an unexpected combination of surfactants that somehow perform synergistically as coating aids when fluid coatings are applied as overcoats to highly surface active contiguous layers. An additional valuable benefit that can result from the practice of the present invention is that the resulting overcoat(s) and coated elements have improved resistance to the development of accumulations of undesirably high levels of static electricity.

The present invention comprises fluid coating compositions, herein also referred to as surfactant coating compositions, containing the special synergistically-acting surfactant combinations of the present invention (which coating compositions also preferably contain a compatible hydrophilic colloid in an aqueous medium). This invention also includes coated elements (including radiation sensitive elements) on at least one of the outer surfaces of which is present a layer of one of the surfactant blends, or surfactant coating compositions, of the present invention, and a process for preparing such coated elements. The presence of such a blend at the surface of the improved element, or especially at a coated surface of a contiguous support, or of a radiation sensitive layer of the element, also effectively reduces the propensity of that surface to generate undesirable static electricity when the surface is contacted by another surface. The surfactant blend should be present in the coated layer in an amount equal to at least about 0.002, to about 2, and preferably from about 0.005 to about 0.5, mg of surfactants per $dm^2$ of coated surface.

The term "contiguous layer" as used herein means any coating layer containing an anionic surfactant, especially a radiation sensitive layer, present in a coated element, as a layer adjacent to and abutting the surfactant layer which comprises the surfactant coating composition described herein.

The term "coated element" as used herein means an element comprising a support, a layer (a) containing at least one anionic surfactant and contiguous to said layer (a) a layer (b) containing at least one cationic surfactant and at least one nonionic surfactant said layer (b) being farther from said support than is said layer (a) and containing the surfactant coating composition of this invention. The compositions of both layers will be similar in that both will be hydrophilic but otherwise will be different. Layer (a) to which coating layer (b) is applied may be a gelatin-containing non-radiation sensitive layer, or it can be a radiation sensitive layer, as defined later herein.

The surfactant coating composition of the invention can be applied directly over a hydrophilic surface of a support or other substrate. Preferably, a radiation sensitive layer will be adhered to the other surface of the support. However, in order to obtain the maximum benefits and advantages of the invention, the new coating composition preferably will be applied over a hydrophilic layer, such as a radiation sensitive layer, or even included in a radiation sensitive layer. In each case, the hydrophilic layer will be one comprising an anionic surfactant.

Typical hydrophilic layers will include undercoatings, subbing layers, and other gelatin-containing or polymeric binder-containing layers of types which are adhered directly to a hydrophobic support to provide a hydrophilic surface on such support. Such layers are discussed in detail below in relation to polyester supports.

Brief Description of the Drawing

This invention can be further illustrated by reference to the accompanying drawing in which.

DESCRIPTION OF THE PREFERRED EMBODIMENTS

Figure 1:
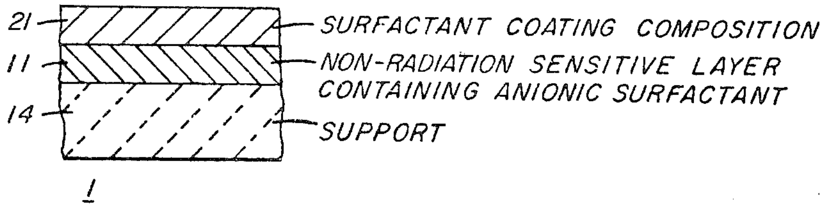
FIG. 1 is a diagrammatical cross-sectional view of a portion of a coated element 1 having a surfactant coating composition layer 21 contiguous to a non-radiation sensitive layer 11 which is contiguous to film support 14.
Figure 2:
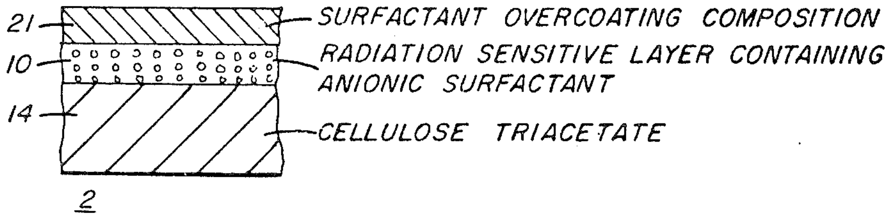
FIG. 2 is a view of an overcoated radiation sensitive element 2, having a radiation sensitive layer 10, adhered to a conventionally subbed cellulose ester film support 14 and overcoated with a surfactant overcoating composition layer 21.
Figure 3:
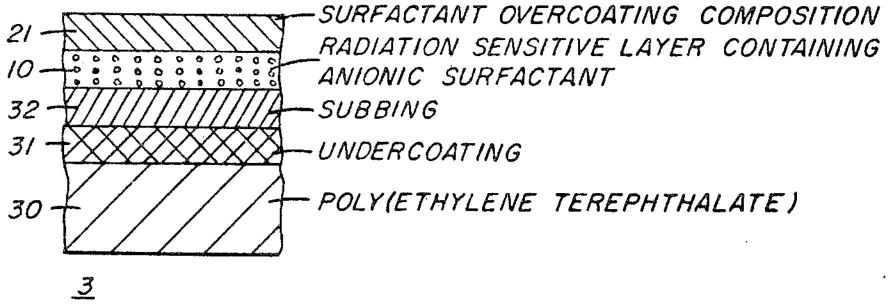
FIG. 3 is a view of an overcoated radiation sensitive element 3, having undercoating layer 31 adhered to a polyester film support 30, a subbing layer 32 adhered to undercoating 31, a radiation sensitive layer 10 adhered to the subbing layer 32, and a surfactant overcoating composition layer 21 adhered to layer 10.
Figure 4:
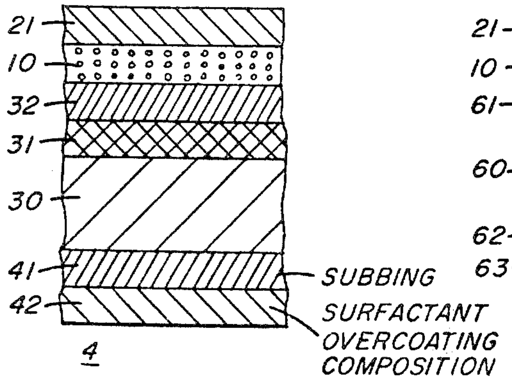
FIG. 4 is a view of an overcoated radiation sensitive element 4 whose structure is similar to that of the radiation sensitive element 3, but which additionally has a subbing layer 41 adhered to the other surface of the support 30 and a second surfactant overcoating composition layer 42, which is adhered to the subbing layer 41.
Figure 6:
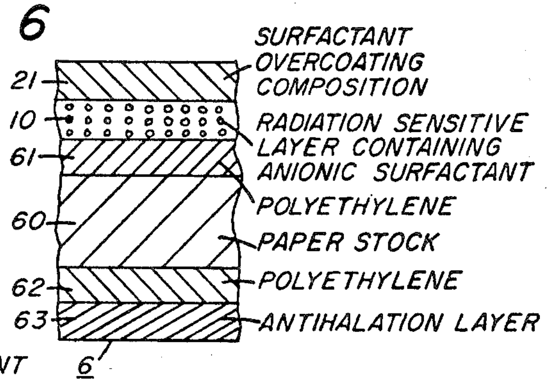
FIG. 6 is a view of an overcoated radiation sensitive element 6 having a paper stock support 60, corona-treated polyolefin layers 61 and 62 adhered to support 60, a radiation sensitive layer 10 containing an anionic surfactant and adhered to polyolefin layer 61, a surfactant overcoating composition layer 21 adhered to radiation sensitive layer 10, and an antihalation layer 63 adhered to polyolefin layer 62.
Figure 5:
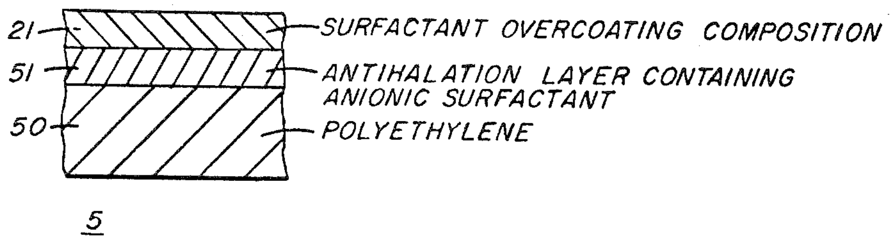
FIG. 5 is a view of an overcoated element 5 having an antihalation layer 51 containing anionic surfactant adhered to a polyolefin support 50 which has been corona treated to make it adherent to layer 51, and having a surfactant coating composition layer 21 adhered to the antihalation layer 51.

The cationic surfactant employed in the practice of this invention is a perfluorinated sulfonamido material having the formula (I):

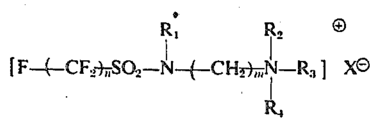

(I)

wherein *n* is an integer of from 1 to 9. It is preferred that *n* be from 3 to 9 and the most preferred value is 8.

The subscript *m* above is an integer of from 1 to 6 and more preferably 2–4. Most preferably, the value of *m* is 3.

$R_1$ in the formula can be hydrogen or an alkyl group of from 1 to 4 carbon atoms as, for example, methyl, ethyl, propyl, butyl or isomers thereof. In a highly preferred embodiment of the present invention, $R_1$ is hydrogen.

$R_2$, $R_3$ and $R_4$ are independently selected and are alkyl groups of from 1 to 6 carbon atoms as, for example, methyl, ethyl, propyl, butyl, pentyl, hexyl and isomers thereof. It is preferred that $R_2$, $R_3$ and $R_4$ have 1–4 carbon atoms, more preferred that they be methyl or ethyl and most preferred that all three be methyl.

$X^{\ominus}$ in the formula is any anionic moiety which will not adversely interfere with the properties of the finished coating. Halide ions, particularly chloride, bromide and iodide, are especially desirable and are preferred. The most preferred halide is the iodide. A particularly useful cationic surfactant which is preferably employed in the practice of this invention is commercially available from 3 M Company under the designation "Fluorad FC 134". The chemical structure of Fluorad FC 134 is understood to be

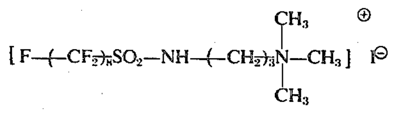

Typical examples of useful cationic surfactants having the structure of formula "I", above, include perfluoroheptylsulfonamido-(N-propyl-3-N,N-dimethyl-N-ethyl) ammonium bromide, perfluorononylsulfonamido-(N-ethyl-2-N,N-N-trimethyl)ammonium iodide, perfluoroheptylsulfonamido-(N-propyl-3-N,N,N-triethyl) ammonium iodide, perfluorooctylsulfonamido-(N-propyl-3-N,N,N-trimethyl)ammonium iodide, perfluorooctylsulfonamido-(N-propyl-3-N,N,N-trimethyl)ammonium chloride, perfluorohexylsulfonamido-(N-butyl-4-N,N,-diethyl-N-propyl)ammonium iodide, and the like.

The nonionic surfactant employed in the practice of this invention is an alkylphenoxypoly(hydroxypropylene oxide) having the formula (II):

(II)

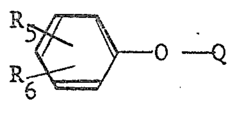

wherein $R_5$ represents an alkyl group having from 6 to 18 carbon atoms, preferably from about 8 to 10 carbon atoms, and is preferably in the para position; $R_6$ represents a hydrogen atom or an alkyl group having from 1 to 18 carbon atoms, and preferably from 6 to 14 carbon atoms; and Q is a polyether group comprising from 3 to 15 hydroxypropylene oxide units, and preferably consists of at least 8 units which can be interconnected by ether linkages through an oxygen atom on any of the three carbon atoms of the propylene unit, such as to form isopropylene and n-propylene moieties in the group.

The alkylphenoxypoly(hydroxypropylene oxides) can be formed by reacting the alkylphenol with hydroxy compounds according to the procedures normally used to prepare polyglycerol-type compounds. However, the compounds and procedures used in the reaction will, of course, affect the degree of branching and precise structural composition of the product. Since the glycerols, glycerides, glycidols and related compounds required to produce the poly(hydroxypropylene oxide) groups have three possible reactions sites, a high degree of random branching in the molecule is likely to occur, especially when several units are formed in the chain during the reaction as, for example, when the reaction is continued to form more than 6 units of glycidol. In instances where the alkyphenoxy compound contains upwards of 6 and preferably at least 8 reacted glycidol units, the compound contains sufficient hydroxy and methylol groups to impart improved water solubility and to provide optimum physical and coating characteristics in certain preferred embodiments.

In one preferred embodiment of this invention, an alkylphenoxypolyglycidol is used in coating hydrophilic colloid layers of photographic elements. These compounds are made by reacting the alkylphenol with a glycidol at a temperature above about 100°C. A typical procedure for reacting glycidols is set forth in Belgian Pat. No. 652,862 granted Sept. 9, 1964.

Typical surface-active agents which are commercially available and which are very useful in this invention include Surfactant 3G (Olin Mathieson Chemical Corp.) which is essentially a para-isononylphenoxypolyglycidol containing an average of 3.3 moles of reacted glycidol; Surfactant 6G (Olin Mathieson Chemical Corp.) which is essentially a para-isononylphenoxypolyglycidol containing an average of about 6 glycidol units; and Surfactant 10G (Olin Mathieson Chemical Corp.) which is essentially a para-isononylphenoxypolyglycidol containing about 10 glycidol units; i.e. para-isononylphenoxy decaglycidol.

Typical examples of useful nonionic surfactants having the structure of formula "II", above, include the various products resulting from the conventional reaction of alkylphenols such as hexylphenol, octylphenols, nonylphenols, and dodecylphenols, in normal and isomeric forms, with an average of 3, 6, 8, 10, 12 and 15 moles of glycidol (per mole of the alkylphenol). Of these, octylphenoxy octaglycidol, octylphenoxy decaglycidol, octylphenoxy dodecaglycidol, nonylphenoxy octaglycidol, nonylphenoxy nonaglycidol, nonylphenoxy decaglycidol, and nonylphenoxy dodecaglycidol are preferred, particularly preferred products having iso-alkyl groups.

A particularly preferred combination of surfactants useful in the practice of this invention is a combination of (a) perfluorooctylsulfonamido-(N-propyl-3,N,N,N-trimethyl) ammonium iodide and (b) para-isononylphenoxy decaglycidol in a weight ratio of from about 2:1 to about 1:75, preferably from about 1.5:1 to about 1:50, respectively. The use of such cationic materials as those designated by formula "I", above, as electrostatic charge control agents has been described and claimed in U.S. Pat. application Ser. No. 163,450, filed July 16, 1971, now abandoned, the disclosure of which is hereby incorporated by reference into the present patent application. Such materials can be readily prepared by conventional means. Similarly, the use of nonionic materials as those designated by formula "II", above, as coating aids has been described and claimed in the aforementioned Knox patent (U.S. Pat. No. 3,514,293).

The anionic surfactant present in the underlying coating layer will be a surfactant which is preferably used in photographic elements.

Preferably, the anionic surfactant has the formula:

$$R_7-(-Ar)_z-SO_3-(-O)_z-M$$

wherein $R_7$ is an alkyl group of from 8 to 20 carbon atoms. As exemplary of such alkyl group are octyl, nonyl, decyl, undecyl, dodecyl, tridecyl, tetradecyl, pentadecyl, hexadecyl, heptadecyl, octadecyl, nonadecyl, eicosyl and isomers thereof. Dodecyl, tetradecyl, hexadecyl, octadecyl and their isomers are preferred, primarily because of their great availability. Dodecyl is especially preferred.

In the above formula, Ar is an arylene group such as, for example, phenylene, naphthylene, anthrylene, phenanthrylene and the like. Naphthylene is preferred.

The two z's in the foregoing formula are independently selected and can be either zero or one. Thus, the anionic surfactanats useful in the practice of the present invention can be alkyl sulfates, alkyl sulfonates, alkyl arylene sulfates or alkyl arylene sulfonates.

M in the above formula represents ammonium or an alkali metal, e.g. sodium or potassium. Sodium alkyl sulfates, such as sodium dodecyl sulfate and the sodium salts of alkyl naphthylene sulfonates are particularly preferred.

As pointed out previously, alkyl arylene sufonates and especially triisopropyl naphthylene sulfonates are highly preferred since excellent coatability of the substrate and dispersibility of the radiation sensitive layer in which they are present are obtained therewith.

Anionic surfactants of the structure

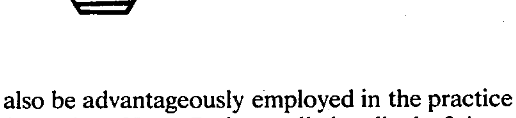

can also be advantageously employed in the practice of this invention. Here, $R_8$ is an alkyl radical of 4 to 12 carbon atoms, *p* is one or two and M is an alkali metal or ammonium. $R_8$ can be straight chain or branched chain butyl, pentyl, hexyl, heptyl, octyl, nonyl, decyl, undecyl or dodecyl. The radical *p* is preferably one and $R_8$ is preferably p-tertiary octyl. The use of these materials in photographic elements is described, for example, in Baldsiefen, U.S. Pat. No. 2,600,831, issued June 17, 1952.

In the practice of this invention, the anionic surfactant will generally be employed in an amount of from about 0.05 mg/dm² to 0.55 mg/dm², preferably at from about 0.10 mg/dm² to 0.35 mg/dm² of coated surface.

In one embodiment the present invention comprises a surfactant coating composition comprising a mixture of A. at least one cationic surfactant having the formula (I):

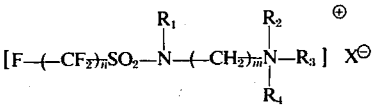 (I)

wherein *n* is an integer of from 1 to 9, *m* is an integer of from 1 to 6, $R_1$ is hydrogen or a lower alkyl group of from 1 to 4 carbon atoms, $R_2$, $R_3$ and $R_4$ are independently selected alkyl groups of from 1 to 6 carbon atoms, and $X^\ominus$ is an anionic moiety; and B. at least one non-ionic surfactant having the formula (II):

(II) 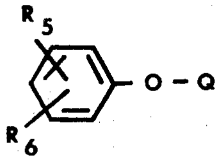

wherein $R_5$ is an alkyl group of from 6 to 18 carbon atoms, $R_6$ is hydrogen or an alkyl group of from 1 to 18 carbon atoms and Q is a polyether group comprising from about 3 to 15 units of hydroxypropylene oxide, said polyether group comprising n-propylene and isopropylene moieties.

Preferably, the weight ratio of said cationic surfactant to said nonionic surfactant in said mixture will be from about 2:1 to about 1:75, respectively. Also, preferably, the mixture will be dispersed or dissolved in a fluid medium, preferably water.

In another embodiment, the present invention comprises an overcoated element comprising at least one first layer having incorporated therein an anionic surfactant and having adhered contiguously to said first layer an overcoating layer of a surfactant coating composition comprising a mixture of the present invention. The first layer may be a non-radiation sensitive layer or a radiation sensitive layer.

In a preferred embodiment, the present invention comprises an overcoated element comprising a support, at least one hydrophilic layer contiguous to at least one surface of said support, at least one of said hydrophilic layers comprising an anionic surfactant, and contiguous to at least the surface of at least one of said hydrophilic layers comprisng an anionic surfactant, a surfactant coating composition comprising a mixture of A. At least one cationic surfactant having the formula (I):

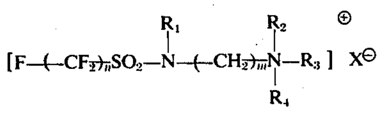 (I)

wherein $n$ is an integer of from 1 to 9, $m$ is an integer of from 1 to 6, $R_1$ is hydrogen or a lower alkyl group of from 1 to 4 carbon atoms, $R_2$, $R_3$ and $R_4$ are independently selected alkyl groups of from 1 to 6 carbon atoms, and $X^{\ominus}$ is an anionic moiety; and B. at least one non-ionic surfactant having the formula (II):

(II)

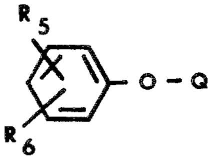

wherein $R_5$ is an alkyl group of from 6 to 18 carbon atoms, $R_6$ is hydrogen or an alkyl group of from 1 to 18 carbon atoms and Q is a polyether group comprising from about 3 to 15 units of hydroxypropylene oxide, said polyether group comprising n-propylene and isopropylene moieties;

the weight ratio of said cationic surfactant to said nonionic surfactant in said mixture being from about 2:1 to about 1:75, respectively.

In another embodiment, the present invention comprises a radiation sensitive element comprising a support and a subbing layer, at least one radiation sensitive layer containing anionic surfactant adhered by one of its surfaces to a surface of said subbing, and having overcoated on its other surface a layer of a surfactant coating composition of this invention. Preferably, the element is a photographic element.

In another embodiment, the present invention comprises a radiation sensitive element comprising a support having over at least one surface at least one radiation sensitive layer, said radiation sensitive layer containing anionic surfactant and being overcoated with a surfactant coating composition of this invention. Preferably, the element is a photographic element.

In another embodiment, this invention comprises a radiation sensitive element comprising a hydrophobic support, a hydrophilic undercoating layer adhered to a first support surface, a first hydrophilic subbing layer adhered to said undercoating layer, a radiation sensitive layer containing anionic surfactant adhered to said subbing layer, a first surfactant coating composition layer adhered to said radiation sensitive layer, a second hydrophilic subbing layer adhered to a second support surface and a second surfactant coating composition adhered to said second subbing layer, said surfactant coating composition layers each containing a coating aid mixture of this invention. Preferably, the element is a photographic element and the radiation sensitive layer is a silver halide emulsion layer.

In another preferred embodiment, the present invention comprises a radiation sensitive element comprising a paper stock support, a first polymeric layer having a hydrophilic surface adhered to a first surface of said support, a second polymeric layer having a hydrophilic surface adhered to a second surface of said support, a hydrophilic layer adhered to the hydrophilic surface of said first polymeric layer, a radiation sensitive layer adhered by one surface to the hydrophilic surface of said second polymeric layer, said radiation sensitive layer containing an anionic surfactant and having adhered to its other surface a surfactant coating composition layer of this invention.

In another embodiment the present invention comprises an improved process for applying a coating layer on a contiguous layer comprising a hydrophilic colloid and an anionic surfactant, which process comprises using in said overcoating layer a surfactant mixture of this invention.

In another preferred embodiment, this invention comprises in a process for making a radiation sensitive element comprising coating a coating composition onto a radiation sensitive layer containing anionic surfactant on a support or other hydrophilic layer containing anionic surfactant and coated on said support, the improvement wherein said coating composition is a surfactant coating composition comprising a mixture of A. at least one cationic surfactant having the formula (I):

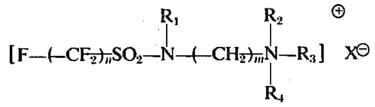

(I)

wherein $n$ is an integer of from 1 to 9, $m$ is an integer of from 1 to 6, $R_1$ is hydrogen or a lower alkyl group of from 1 to 4 carbon atoms, $R_2$, $R_3$ and $R_4$ are independently selected alkyl groups of from 1 to 6 carbon atoms and $X^{\ominus}$ is an anionic moiety; and B. at least one nonionic surfactant having the formula (II):

(II)

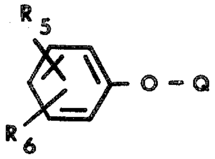

wherein $R_5$ is an alkyl group of from 6 to 18 carbon atoms, $R_6$ is hydrogen or an alkyl group of from 1 to 18 carbon atoms and Q is a polyether group comprising from about 3 to 15 units of hydroxypropylene oxide, said polyether group comprising n-propylene and isopropylene moieties;

the weight ratio of said cationic surfactant to said nonionic surfactant in said mixture being from about 2:1 to about 1:75, respectively.

In another embodiment, the present invention comprises an improved process for reducing coating defects and improving resistance to development of static electricity in an overcoated element, comprising forming a fluid, preferably aqueous, mixture of the synergistically acting cationic and nonionic surfactants described herein and applying the mixture as coating on a contiguous outer hydrophilic layer containing an anionic surfactant such as a radiation sensitive layer containing anionic surfactant therein, preferably by simultaneous coating technique as later described herein.

In yet another aspect, the present invention comprises an improved process for both reducing coating defects and improving resistance to development of static electricity in a coated element comprising at least one anionic surfactant-containing hydrophilic layer, the process comprising:

mixing together in a fluid medium and forming a blend of

A. at least one cationic surfactant having the formula (I):

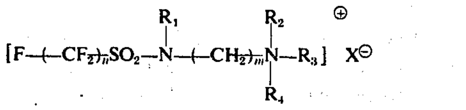

(I)

wherein $n$ is an integer of from 1 to 9, $m$ is an integer of from 1 to 6, $R_1$ is hydrogen or a lower alkyl group of from 1 to 4 carbon atoms, $R_2$, $R_3$ and $R_4$ are independently selected alkyl groups of from 1 to 6 carbon atoms, and $X^{\ominus}$ is an anionic moiety; and B. at least one nonionic surfactant having the formula (II):

(II)

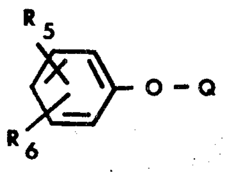

wherein $R_5$ is an alkyl group of from 6 to 18 carbon atoms, $R_6$ is hydrogen or an alkyl group of from 1 to 18 carbon atoms and Q is a polyether group comprising from about 3 to 15 units of hydroxypropylene oxide, said polyether group comprising n-propylene and isopropylene moieties;

the weight ratio of said cationic surfactant to said nonionic surfactant in said mixture being from about 2:1 to about 1:75, respectively, and coating said blend on said anionic surfactant-containing hydrophilic layer.

Preferably, the element is a radiation sensitive element, such as a photographic element, but it also can be a nonradiation sensitive element, such as a leader film for a radiation sensitive film, or a magnetic tape.

In still another preferred process embodiment, the blend, or surfactant coating composition, will be applied as an overcoating to the element substantially simultaneously with the anionic surfactant-containing hydrophilic layer forming composition as it is being applied to a support to form a simultaneously coated and overcoated element. In the preferred embodiments, the mixture or blend will also contain at least one hydrophilic colloid, preferably gelatin.

In practice, the surfactant coating composition is prepared by blending the cationic and nonionic surfactants in a volatile fluid medium. The fluid medium, preferably, is water. Preferably, the surfactants are blended in the presence of a hydrophilic colloid. A preferred embodiment of such composition includes an amount of at least one hydrophilic colloid in the form of a compatible polymeric binder material sufficient to cause the resulting mixture to adhere together (and to the underlying layer) when the fluid, or solvent, portion of the coating composition has been removed therefrom (usually via evaporation). The amount of water present in the mixture will be at least about 25 weight percent of the surfactant coating composition, and preferably will be from about 60 to 99.995 weight percent. Fluid mediums can comprise water or a mixture of miscible organic solvent and water in suitable amounts for dissolving or dispersing the hydrophilic colloid for coating purposes. Suitable organic solvents include ketones, such as acetone and methyl ethyl ketone; alcohols, such as methyl, ethyl, propyl, isopropyl, butyl, etc. in normal and isomeric forms. Other solvents known to the art may also be used.

Useful compatible hydrophilic colloid materials include all of those that can be dispersed or dissolved in the fluid, preferably aqueous, medium of the coating composition, which are film-formers when the coating is dried under conventional conditions, and which are compatible with the cationic and nonionic surfactants present thereon. Typical non-limiting examples of such compatible colloid binder materials are polyvinyl alcohol, polyacrylamide, polyvinylpyrrollidone and gelatin. Of these, gelatin is preferred because of the contemporary large scale use of gelatin in radiation sensitive layers. While water is preferred as the fluid medium, it is to be understood that the valuable coatings of the present invention can also be applied from non-aqueous fluid coating compositions, particularly organic solvent types, as discussed above, the solvent portion of such compositions having to be readily volatile under conventional coating conditions.

Although the preferred polymeric binder is a hydrophilic colloid, specifically gelatin, the binder may be some other hydrophilic colloidal material such as colloidal albumin, a cellulose derivative, or a synthetic resin, for instance, a polyvinyl compound. Some colloids which may be used are polyvinyl alcohol (mentioned above) or a hydrolyzed polyvinyl acetate as described in Lowe U.S. Pat. No. 2,286,215, issued June 16, 1952; a hydrolyzed cellulose ester such as cellulose acetate hydrolyzed to an acetyl content of 19–26% as described in U.S. Pat. No. 2,327,808, of Lowe and Clark, issued Aug. 24, 1943; a water-soluble ethanolamine cellulose acetate as described in Yutzy U.S. Pat. 2,322,085, issued June 15, 1943; a polyacrylamide (mentioned above) or an imidized polyacrylamide as described in Lowe, Minsk, and Kenyon U.S. Pat No. 2,563,791, issued Aug. 7, 1951; a vinyl alcohol polymer containing urethane carboxylic acid groups of the type described in Unruh and Smith U.S. Pat. No. 2,768,154, issued Oct. 23, 1956; or containing cyanoacetal groups such as the vinyl alcohol-vinyl cyanoacetate copolymer as described in Unruh, Smith and Priest, U.S. Pat. No. 2,808,331, issued Oct. 1, 1957; or a polymeric material which results from polymerizing a protein or a saturated acylated protein with a monomer having a vinyl group as described in U.S. Pat. No. 2,852,382 of Illingsworth, Dann and Gates issued Sept. 16, 1958; or certain acrylate copolymers may be used such as the copolymers described in Houck et al., U.S. Pat. No. 3,062,674. If desired, compatible mixtures of two or more of these colloids may be employed for preparing the surfactant coating composition.

After preparation of the surfactant coating composition of this invention, the composition can be applied as an overcoat layer by standard emulsion coating techniques to contiguous layers of photographic, radiographic, or other radiation sensitive film elements. The use of the surfactant coating compositions in accordance with the invention facilitates the overcoating of such film elements by high-speed coating techniques. For example, the compositions operate well in an apparatus used in a process for applying a plurality of separate coating materials to a support in layer relationship substantially simultaneously while maintaining a distinct relationship between the layers after they have been cured or dried on the support. Such a technique is known in the art as a "simultaneous coating process." One form of apparatus used in carrying out the process is called a "multiple slide hopper."

Multiple coating techniques and apparatus therefor are described in British Pat. Nos. 855,849 and 929,905 and U.S. Pat. No. 2,761,791 of Russell. The present invention is especially useful when used in a method of multiple coating such as that taught in U.S. Pat. No. 2,761,791, incorporated herein in its entirety by reference.

The valuable benefits of the present invention can be obtained by application of the materials in admixture to the surface that is being treated, preferably by use of a coating composition containing at least water (preferably at least about 60 weight percent), at least about 0.005 and up to about 0.5% (and preferably from about 0.01 to about 0.2) weight percent (combined weight if more than one is used) of one or more "I" (cationic) materials, and enough of one or more "II" (nonionic) materials to produce in the resulting aqueous coating composition the desired weight ratio of materials. Preferably, the aqueous coating compositions of this invention will contain a total of at least about 0.01 up to about 2 (and preferably from about 0.05 to about 0.5) weight percent of the nonionic surfactant material. It is also preferred that the coating compositions of the present invention contain at least about 0.5 weight percent of one or more of the aforementioned colloid binders and that the compositions be readily coatable by conventional means.

Materials other than the cationic and nonionic surfactants described above (for example, as materials "A" and "B" in Table I) can also be present in the surfactant coating compositions of the present invention. For example, the compositions can contain dyes, lubricants, pigments, dispersing agents, matting agents, polymers, metallic particles magnetic oxide particles, and the like, generally in effective amounts. However, it has been found that when the surfactant coating mixture also contains dispersed forms of photographic lubricants in the presence of gelatin in a high speed simultaneous coating operation, there may be a tendency for the lubricant particles to agglomerate into "clumps." The advantages of the present invention can nevertheless be obtained by forming a surfactant coating composition of the present invention and containing photographic lubricant by an invention disclosed and claimed by McGraw in U.S. Pat. application Ser. No. 230,519.

Typical support materials used to practice the invention include cellulose nitrate film; cellulose ester, preferably cellulose acetate film, poly(vinyl acetal) film, polystyrene film, polyester, preferably poly(ethylene terephthalate) film, polycarbonate film and related films or resinous materials, as well as glass, paper, metal, and the like. Typically a flexible support is employed. Paper supports coated with an alpha-olefin polymer, particularly a polymer of an alpha-olefin containing 2 to 10 carbon atoms, as exemplified by polyethylene, polypropylene, ethylenebutene copolymers and the like, can also be employed. Polyolefin coated paper of the type preferably used in practice of the invention is taught in U.S. Pat. No. 3,411,908, incorporated herein by reference.

Suitable polyester sheeting for use as a support in this invention can be prepared from high molecular weight polyesters derived by condensing a dihydric alcohol with a dibasic saturated fatty carboxylic acid or derivatives thereof. Suitable dihydric alcohols for use in preparing polyesters are well known in the art and include any glycol wherein the hydroxyl groups are on the terminal carbon atom and contain from 2 to 12 carbon atoms, such as, for example, ethylene glycol, propylene glycol, trimethylene glycol, hexamethylene glycol, decamethylene glycol, dodecamethylene glycol, and 1,4-cyclohexane dimethanol. Dibasic acids that can be employed in preparing polyesters are well known in the art and include those dibasic acids containing from 2 to 16 carbon atoms. Specific examples of suitable dibasic acids include adipic acid, sebacic acid, isophthalic acid, and terephthalate acid. The alkyl esters of the above-enumerated acids can also be employed satisfactorily. Other suitable dihydric alcohols and dibasic acids that can be employed in preparing polyesters from which sheeting can be prepared are described in J. W. Wellman, U.S. Pat. No. 2,720,903, dated Oct. 11, 1955.

Specific preferred examples of polyester resins which, in the form of sheeting, can be used in this invention are poly(ethylene terephthalate), poly(cyclohexane 1,4-dimethylene terephthalate), and the polyester derived by reacting 0.83 mol of dimethyl terephthalate, 0.17 mol of dimethyl isophthalate and at least one mol of 1,4-cyclohexanedimethanol. U.S. Pat. No. 2,901,466 discloses polyesters prepared from 1,4-cyclohexanedimethanol and their method of preparation.

The thickness of the polyester sheet material employed in carrying out this invention is not critical. Polyester sheeting of a thickness of from about 2 mils to 50 mils can be employed satisfactorily. Usually, for photographic products, the thickness of the polyester sheeting used will be of the order of from about 3 to 5 mils. A preferred polyester resin photographic film support may be the poly(ethylene terephthalate) which is described in U.S. Pat. No. 2,627,088 and 2,779,684.

Polyesters, and particularly poly(ethylene terephthalate) are very hydrophobic, and the polyester sheeting used in this invention must be provided with an intermediate anchoring layer thereon prior to the application thereto of other layers, for example, a light sensitive or an anti-curl layer as taught in U.S. Pat. No. 3,501,301, incorporated herein by reference. An intermediate anchoring layer is often referred to in the art as an undercoating layer, a subbing layer, a sublayer, or a substrate layer.

Resins and resin compositions for use in providing such intermediate anchoring layers, or sublayers, on a surface of polyester sheeting are well known in the art but nevertheless constitute a part of this invention. A suitable resin for this purpose is a copolymer comprised of, by weight, from about 35 percent to 96 percent of vinylidene chloride, from about 3.5 percent to 64.5 percent of an ethylenically unsaturated ester (also referred to as an acrylic ester), and from about 0.5 to 25 percent of itaconic acid or the half methyl ester of itaconic acid, acrylic acid, or methacrylic acid. The ethylenically unsaturated esters can be acrylonitrile, methacrylonitrile, vinyl chloride, and alkyl esters of acrylic and methacrylic acids having 1 to 18 carbon atoms in the alkyl group such as methyl acrylate, ethyl acrylate, butyl acrylate, methyl methacrylate, ethyl methacrylate and butyl methacrylate. A terpolymer of the above type that has been used satisfactorily in carrying out this invention is a terpolymer of methyl acrylate, vinylidene chloride and itaconic acid, a specific example of such terpolymer being one comprised of, by weight, about 15 percent of methyl acrylate, about 83 percent of vinylidene chloride, and 2 percent of itaconic acid.

To establish and maintain adequate and satisfactory adhesion of the sublayer to a surface of the polyester sheeting to which it is applied, an adhesion promoter can be incorporated therein prior to application thereof to a surface of the polyester sheeting. The subbing resins as above described are usually applied from a water dispersion (often referred to as a latex thereof). The amount of adhesion promoter employed should be from about 0.1 percent to 5 percent by weight based on the weight of the subbing resin. Water is employed as a vehicle or carrier for the copolymer and the adhesion promoter when applied to the polyester sheet material. The water is subsequently removed from the applied coating by drying.

Examples of suitable adhesion promoters for this purpose include resorcinol, orcinol, catechol, pyrogallol, 1-naphthol, 2,4-dinitrophenol, 2,4,6-trinitrophenonol, 4-chlororesorcinol, 2,4-dihydroxytoluene, 1,3-naphthalenediol, 1,6-naphthalenediol, acrylic acid, the sodium salt of 1-naphthol-4-sulfonic acid, benzyl alcohol, trichloroacetic acid, dichloroacetic acid, o-hydroxybenzotrifluoride, n-hydroxybenzetrifluoride, o-fluorophenol, m-fluorophenol, p-fluorophenol, chloral hydrate, and o-creosol. Mixtures of two or more adhesion promoters can be employed if desired.

To the subbed surface of the polyester sheet material there can be applied a matte coating composition. The "matte" portion of the matte layer can be any of a number of particulate conventional materials, ranging in particle size from about 1 to about 10 microns, that retain their particulate structure on the surface of the film product, the particulate layer (held in place by a hydrophobic resin binding agent) resulting in the desired, rough "matte" -type surface. Typical, nonlimiting examples of suitable "matte" materials include inorganic abrasive materials like silica, glass, quartz, diatomaceous earth, and calcium carbonate as well as organic resinous materials like the polyamide and interpolyamide resins described in U.S. Pat. No. 3,227,576.

Methods of preparing subbed, matte-surfaced polyester sheeting are detailed in U.S. Pat. No. 3,227,576 and 3,589,905, the disclosures of which are incorporated by reference into the present disclosure to form an integral part thereof.

Suitable sheeting for use as a support in this invention can also be prepared from cellulose acetate containing from 42.5 to 44.0 percent acetyl. Such cellulose triacetate esters are described in U.S. Pat. No. 2,492,977, 2,492,978, and 2,739,069. However, a mixed cellulose ester, such as the cellulose acetate propionate described in U.S. Pat. No. 2,739,070, also may be used.

As discussed above, the surfactant coating composition of the invention can also be applied as an overcoating onto a radiation sensitive layer directly adhered to a hydrophilic support surface or to a subbing layer of a radiation sensitive element. The radiation sensitive layer will preferably be a silver halide emulsion layer, which itself may comprise a plurality of thinner layers. The process of the invention is especially advantageous for the simultaneous coating of the radiation sensitive emulsion layer and the coating composition.

The surfactant coating mixture of this invention can also be employed other than as a coating composition by including it in various kinds of silver halide photographic emulsions in non-fogging amounts. It is known that cationic surfactants are a cause of fog formation when used in excessive amounts in a radiation sensitive element. The amounts recommended for use in the present invention are below such amounts. In addition to being useful in orthochromatic, panchromatic and infrared-sensitive emulsions, these coating aids are also useful in x-ray and other nonoptically sensitized emulsions. They can be used in sulfur and gold sensitized silver halide emulsions. Emulsions containing various types of silver salts can be used such as silver bromide, silver iodide, silver chloride or mixed silver halides such as silver chlorobromide, silver bromoiodide or silver chloroiodide. The coating aids employed in the practice of this invention can be used to coat hydrophilic colloid layers in elements intended for color photography, for example, silver halide emulsions containing colorforming couplers or emulsions to be developed in solutions containing couplers or other color-generating materials.

The silver halide emulsions used with this invention can also contain development modifiers that function as speed increasing compounds such as polyalkylene glycols, cationic surface active agents and thioethers or combinations of these as described in Piper U.S. Pat. No. 2,886,437 issued May 12, 1959; Dann et al. U.S. Pat. No. 3,046,134 issued July 24, 1962; Carroll et al. U.S. Pat. No. 2,944,900 issued July 12, 1960; and Goffe U.S. Pat. No. 3,294,540 issued Dec. 27, 1966.

The photographic elements prepared by the process of this invention can contain incorporated developing agents such as hydroquinones, catechols, aminophenols, 3-pyrazolidones, ascorbic acid and its derivatives, reductones and phenylenediamines. Combinations of developing agents can be employed in the practice of the invention. The developing agents can be in a silver halide emulsion and/or in another suitable location in the photographic element. The developing agents may be added from suitable solvents or in the form of dispersions as described in Yackel U.S. Pat. No. 2,592,368 issued April 8, 1952; and Dunn et al. French Pat. No. 1,505,778.

The photographic and other hardenable layers prepared according to this invention can be hardened by various organic or inorganic hardeners, alone or in combination, such as the aldehydes, and blocked aldehydes as described in Allen et al. U.S. Pat. No. 3,232,764 issued Feb. 1, 1966, ketones, carboxylic and carbonic acid derivatives, sulfonate esters, sulfonyl halides and vinyl sulfonyl ethers as described in Burness et al. U.S. Pat. No. 3,539,644 issued Nov. 10, 1970, active halogen compounds, epoxy compounds, aziridines, active olefins, isocyanates, carbodiimides, polymeric hardeners such as oxidized polysaccharides like dialdehyde starch and oxyguargum and the like.

Photographic elements resulting from the practice of this invention can comprise conventional antistatic or conducting layers. Such layers may comprise soluble salts, e.g. chlorides, nitrates, etc., evaporated metal layers, ionic polymers such as those described in Minsk U.S. Pat. No. 2,861,056 issued Nov. 18, 1958 and Sterman et al. U.S. Pat. No. 3,206,312 issued Sept. 14, 1965, or insoluble inorganic salts such as those described in Trevoy U.S. Pat. No. 3,428,451 issued Feb. 18, 1969.

These photographic elements can contain matting agents such as starch, titanium dioxide, zinc oxide, silica, polymeric beads including beads of the type described in Jelley et al. U.S. Pat. No. 2,992,101 issued July 11, 1961 and Lynn U.S. Pat. No. 2,701,245 issued Feb. 1, 1955; and can also contain brightening agents such as stilbenes, triazines, oxazoles and coumarin brightening agents. Water soluble brightening agents may be used such as those described in Albers et al. German Pat. No. 972,067 issued May 14, 1959 and McFall et al. U.S. Pat. No. 2,933,390 issued Apr. 19, 1960; or dispersions of brighteners may be used such as those described in Jansen German Pat. No. 1,150,274 issued June 12, 1963; Oetiker et al. U.S. Pat. No. 3,406,070 issued Oct. 15, 1968; and Heidke French Pat. No. 1,530,244.

The various layers, including the photographic layers, of the aforementioned elements can contain light absorbing materials and filter dyes such as those described in Sawday U.S. Pat. No. 3,253,921 issued May 31, 1966; Gasper U.S. Pat. No. 2,274,782 issued Mar. 3, 1942; Silberstein et al. U.S. Pat. No. 2,527,583 issued Oct. 31, 1950; and Van Campen U.S. Pat. No. 2,956,879 issued Oct. 18, 1960. If desired, the dyes can be mordanted, for example, as described in Jones et al. U.S. Pat. No. 3,282,699 issued Nov. 1, 1966.

The photographic layers prepared in accordance with this invention can be coated by various coating procedures including dip coating, air knife coating, curtain coating, or extrusion coating using hoppers of the type described in Beguin U.S. Pat. No. 2,681,294 issued June 15, 1954. If desired, two or more layers may be coated simultaneously by the procedures described in U.S. Pat. No. 2,761,791, referred to above, U.S. Pat. No. 3,508,947, and British Pat. No. 837,095. This invention also can be used for silver halide layers coated by vacuum evaporation as described in British Pat. No. 968,453.

This invention may be used with elements designed for color photography, for example, elements containing color-forming couplers such as those described in Frohlich et al. U.S. Pat. No. 2,376,679 issued May 22, 1945; Jelley et al. U.S. Pat. No. 2,322,027 issued June 15, 1943; Fierke et al. U.S. Pat. No. 2,801,171 issued July 30, 1957; Godowsky U.S. Pat. No. 2,698,794 issued Jan. 4, 1955; Barr et al. U.S. Pat. No. 3,227,554 issued Jan. 4, 1966; Graham et al. U.S. Pat. No. 3,046,129 issued July 24, 1962; Vittum et al. U.S. Pat. No. 2,360,290 issued Oct. 10, 1944; and Thirtle et al. U.S. Pat. No. 2,701,197 issued Feb. 1, 1955; or elements to be developed in solutions containing color-forming couplers such as those described in Mannes et al. U.S. Pat. No. 2,252,718 issued Apr. 18, 1952; and Schwan et al. U.S. Pat. No. 2,950,970 issued Aug. 30, 1966; and in false-sensitized color materials such as those described in Hanson U.S. Pat. No. 2,763,549 issued Sept. 18, 1956.

Photographic elements prepared according to this invention can be processed by various methods including processing in alkaline solutions containing conventional developing agents such as hydroquinones, catechols, aminophenols, 3-pyrazolidones, phenylenediamines, ascorbic acid derivatives, hydroxylamines, hydrazines, reductones and the like; web processing such as described in Tregillus et al. U.S. Pat. No. 3,179,517 issued Apr. 20, 1965; stabilization processing as described in Russell et al. "Stabilization Processing of Films and Papers," PSA Journal Vol. 16B, August, 1950; monobath processing as described in Levy "Combined Development and Fixation of Photographic Images with Monobaths," Phot. Sci, and Eng., Vol. 2, No. 3, October, 1958, and Barnes et al. U.S. Pat. No. 3,392,019 issued July 9, 1968. If desired, the photographic elements of this invention can be processed in hardening developers such as those described in Allen et al. U.S. Pat. No. 3,233,761 issued Feb. 1, 1966; in roller transport processors such as those described in Russell et al. U.S. Pat. No. 3,025,779 issued Mar. 20, 1962; or by surface application processing as described in Example 3 of Kitze U.S. Pat. No. 3,418,132 issued Dec. 24, 1968.

As discussed above, the surfactant overcoating composition of this invention renders the film element less subject to developing antistatic charges than when the overcoating of the invention is not used. However, under some usages additional antistatic protection may be necessary to draw off antistatic charges which do develop under particular conditions. In such usage, it will be preferable to include a conventional type of antistatic material in the element, such as those mentioned above.

The following examples are included for a further understanding of the invention.

EXAMPLES

The valuable synergistic nature of the compositions of this invention can readily be illustrated by the following examples, wherein a simulated conventional photographic layer (which is extremely surface active) containing 0.86 mg. of an anionic surfactant, sodium triisopropyl naphthalene sulfonate, per $dm^2$, 24.4 mg. gelatin per $dm^2$ and 1.3 mg. per $dm^2$ of treated surface of a non-wandering magenta dye was coated on a conventional cellulose acetate film support and simultaneously overcoated with a surfactant coating composition in the form of a water dispersion containing 10 weight percent of gelatin plus an appropriate amount of one or more surfactants, as set out in Table I below. The surfactant coating composition was applied so that 10 mg. gelatin per $dm^2$ of surface were applied to the treated surface of the simulated photographic layer.

TABLE I

| Example | Coating Aid | (mg Surfactant/ $dm^2$ of surface | Observations |
|---|---|---|---|
| | A. | B. | |
| 1 | 0 | 0 | Extremely bad repellency. |
| 2 | 0 | 0.05 | Very bad repellency and pulled in edges. |

TABLE I-continued

| Example | Coating Aid | (mg Surfactant/ $dm^2$ of surface) | Observations |
|---|---|---|---|
| 3 | 0 | 0.11 | Repellency and pulled-in edges |
| 4 | 0 | 0.22 | Crescents |
| 5 | 0.05 | 0 | Repellency and pulled-in edges |
| 6 | 0.11 | 0 | Repellency and pulled-in edges |
| 7 | 0.05 | 0.05 | No repellency, some contraction at edges. |
| 8 | 0.05 | 0.11 | Superior coating; no repellency edges fine. |

A = perfluorooctylsulfonamido-(N-propyl-3-N,N,N-trimethyl) ammonium iodide. (Formula I type compound.)
B = p-nonylphenoxy decaglycidol. (Formula II type compound.)

Whereas the valuable synergistic benefits described hereinbefore have been tested and detailed in the above examples with respect only to one particularly preferred embodiment of the present invention, it is believed that improved coatability can be observed through the use of any of the combinations of "A" plus "B" materials, as set out hereinbefore, so long as the weight ratio of material "A" to material "B", respectively, is within the range of from about 2:1 to about 1:75, and preferably from about 1.5:1 to about 1:50.

As was mentioned hereinbefore, another of the benefits that can be attained by practicing this invention relates to the protection of the resulting coated elements from the excessive formation of static electricity during the subsequent handling of the elements. This protection is due to the peculiar ability of the perfluorinated cationic surfactant portion of the present compositions to function as a "charge control agent", thereby reducing significantly the triboelectric charging characteristics of that surface of the product element treated therewith.

An extended discussion of charge control agents, triboelectric charging characteristics and methods for the measurement of the effect of such agents appears in U.S. Pat. application Ser. No. 163,450, filed July 16, 1971, (referred to hereinbefore). Also equipment for the measurement of triboelectric static charges is described in U.S. Pat. No. 3,501,653. This valuable benefit can be readily appreciated when it is realized that the triboelectric charge for a layer consisting essentially of gelatin is +30 esu/$cm_2$ (electro-static units per square centimeter), that of Example 3, above (containing the nonionic surfactant plus gelatin) is about +28 esu/$cm^2$, while that of Example 8 is only +2 esu/$cm^2$. The significance of this improvement becomes clear in view of the fact that dangerous, troublesome static discharge occurs when a net triboelectric charge of 8 to 10 esu/$cm^2$ accumulates at a given part of the gelatin coating. This is true particularly in the case of a polymeric film such as cellulose acetate or poly(ethylene terephthalate) coated with a conventional, mainly gelatin-based photographic emulsion, although the particular "discharge level" will vary somewhat, depending upon materials, humidity conditions, and the like.

It should also be noted that the particular type of support, substrate or radiation sensitive layer(s) over which the present compositions are applied are generally not determinative of the operability of the present invention. However, it is believed surprising that the present coating compositions can be successfully used (and can even exhibit the synergism demonstrated above) when applied over an extremely surface active layer such as that used in preparing the coatings of the above "Examples", because of the anionic nature of the surface active layer (since one would ordinarily expect an undesirable reaction between the anionic surfactant in the underlayer and the cationic surfactant in the coating composition). Indeed, such a reaction could have helped explain the relatively poor performance of the cationic surfactant alone in the above Examples 5 and 6.

This invention has been described in detail with particular reference to preferred embodiments thereof, but it will be understood that variations and modifications can be effected within the spirit and scope of the invention.

What is claimed is:

1. An element comprising a support, a layer (a) containing at least one anionic surfactant and contiguous to said layer (a) a layer (b) containing a mixture of at least one cationic surfactant and at least one nonionic surfactant, said layer (b) being farther from said support than is said layer (a); said mixture comprising A. at least one cationic surfactant having the formula (I):

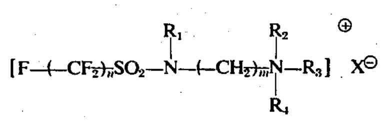

(I)

wherein $n$ is an integer of from 1 to 9, $m$ is an integer of from 1 to 6, $R_1$ is hydrogen or a lower alkyl group of from 1 to 4 carbon atoms, $R_2$, $R_3$ and $R_4$ are independently selected alkyl groups of from 1 to 6 carbon atoms, and $X^\ominus$ is an anionic moiety; and B. at least one non-ionic surfactant having the formula (II):

(II)

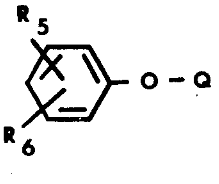

wherein $R_5$ is an alkyl group of from 6 to 18 carbon atoms, $R_6$ is hydrogen or an alkyl group of from 1 to 18 carbon atoms and Q is a polyether group comprising from about 3 to 15 units of hydroxypropylene oxide, said polyether group comprising n-propylene and isopropylene moieties;

the weight ratio of said cationic surfactant to said nonionic surfactant in said mixture being from about 2:1 to about 1:75, respectively.

2. An element as in claim 1, wherein said anionic surfactant is a material having the formula:

$$R_7-(Ar)_z-SO_3-(O)_z-M$$

wherein $R_7$ is an alkyl group of from 8 to 20 carbon atoms, Ar is arylene, each *z* is independently selected and is either zero or one and M is an alkali metal or ammonium, or the structure

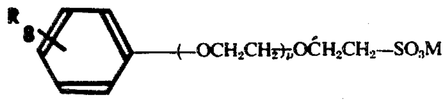

wherein $R_8$ is an alkyl radical of from 4 to 12 carbon atoms, P is one or two and M is an alkali metal or ammonium.

3. An element as in claim 2, wherein the mixture also contains at least one hydrophilic colloid.

4. An element as in claim 3, wherein the hydrophilic colloid is gelatin.

5. An element as in claim 4, wherein said cationic surfactant has the formula:

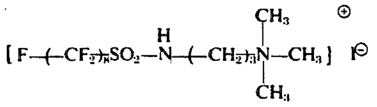

and the weight ratio of cationic to nonionic surfactant is from about 1.5:1 to about 1:50, respectively.

6. An element as in claim 4, wherein said nonionic surfactant has the formula:

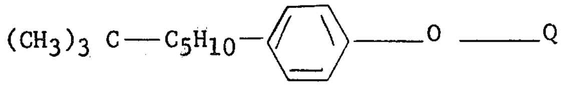

wherein Q is a polyether group comprising about 10 propenoxy units, and the weight ratio of cationic to nonionic surfactant is from about 1.5:1 to about 1:50, respectively.

7. An element as in claim 4, wherein the cationic surfactant is perfluorooctylsulfonamido-(N-propyl-3-N,N,N-trimethyl) ammonium iodide and the nonionic surfactant is para-isononylphenoxy decaglycidol, in the weight ratio of from about 1.5:1 to about 1:50, respectively.

8. An element as in claim 1, wherein said element comprises from about 0.002 mg to about 2.0 mg of said surfactants in said mixture per $dm^2$ of surface of layer (a).

9. An element as in claim 1, wherein said support is selected from a solid linear polyester, polyamide, polyolefin, polycarbonate, polystyrene, lower alkyl ester of cellulose, or paper stock.

10. An element as in claim 9, wherein said support is a polyester support.

11. An element as in claim 9, wherein said support is a paper support.

12. An element as in claim 9, wherein said support is a support of a lower alkyl ester of cellulose.

13. An element as in claim 9, wherein said support is a removable support.

14. An element as in claim 1, wherein layer (a) is a non-radiation-sensitive layer containing a hydrophilic colloid.

* * * * *

UNITED STATES PATENT AND TRADEMARK OFFICE

CERTIFICATE OF CORRECTION

PATENT NO. : 4,013,696

DATED : March 22, 1977

INVENTOR(S) : John M. Babbitt and James F. Houle

It is certified that error appears in the above-identified patent and that said Letters Patent are hereby corrected as shown below:

Column 6, line 22, change "reactions" to -- reaction --.

Column 15, line 39, change "n-hydroxybenzetrifluoride" to -- m-hydroxybenzetrifluoride --.

Column 18, line 26, change "3,233,761" to -- 3,223,761 --.

Signed and Sealed this

*Fourth* Day of *April 1978*

[SEAL]

*Attest:*

RUTH C. MASON
*Attesting Officer*

LUTRELLE F. PARKER
*Acting Commissioner of Patents and Trademarks*